(12) United States Patent
Rose

(10) Patent No.: US 7,049,722 B2
(45) Date of Patent: May 23, 2006

(54) MOTOR CORE CONSTRUCTION

(76) Inventor: Mitchell Rose, 2443 Claver Rd., University Heights, OH (US) 44118

( * ) Notice: Subject to any disclaimer, the term of this patent is extended or adjusted under 35 U.S.C. 154(b) by 84 days.

(21) Appl. No.: 10/833,102

(22) Filed: Apr. 28, 2004

(65) Prior Publication Data

US 2004/0195933 A1   Oct. 7, 2004

Related U.S. Application Data

(60) Division of application No. 10/614,371, filed on Jul. 7, 2003, now Pat. No. 6,803,691, which is a continuation of application No. 09/923,484, filed on Aug. 6, 2001, now Pat. No. 6,664,689.

(51) Int. Cl.
*H02K 1/12* (2006.01)
(52) U.S. Cl. .................. 310/156.01; 336/229; 336/234
(58) Field of Classification Search ........... 310/156.01, 310/156.36, 216, 254, 256; 336/229, 234
See application file for complete search history.

(56) References Cited

U.S. PATENT DOCUMENTS

| | | | | | |
|---|---|---|---|---|---|
| 2,703,392 | A | * | 3/1955 | Rex ........................... | 336/130 |
| 4,056,411 | A | * | 11/1977 | Chen et al. ................. | 148/121 |
| 4,187,441 | A | * | 2/1980 | Oney ......................... | 310/112 |
| 4,707,645 | A | * | 11/1987 | Miyao et al. ................ | 318/254 |
| 5,235,488 | A | * | 8/1993 | Koch .......................... | 361/45 |
| 5,334,899 | A | * | 8/1994 | Skybyk ....................... | 310/268 |
| 5,440,185 | A | * | 8/1995 | Allwine, Jr. ........... | 310/156.37 |
| 5,977,684 | A | * | 11/1999 | Lin ............................. | 310/268 |
| 6,344,703 | B1 | * | 2/2002 | Sawada et al. ............... | 310/90 |
| 6,373,162 | B1 | * | 4/2002 | Liang et al. ........... | 310/156.53 |
| 6,531,946 | B1 | * | 3/2003 | Abe et al. ................... | 336/213 |

* cited by examiner

*Primary Examiner*—Darren Schuberg
*Assistant Examiner*—David W. Scheuermann

(57) ABSTRACT

An electrical machine has a core that includes stranded magnetically permeable material. The core is elongated to thereby define a lengthwise direction and a profile that is transverse to the lengthwise direction. Coils are wound about the core profile and sequentially disposed along the lengthwise direction. A magnet is adjacent to the core and movable relative to the core.

14 Claims, 11 Drawing Sheets

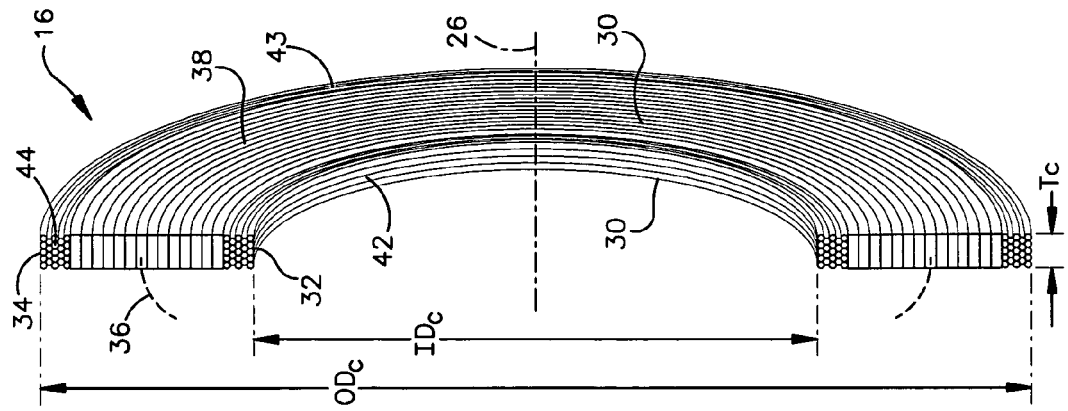
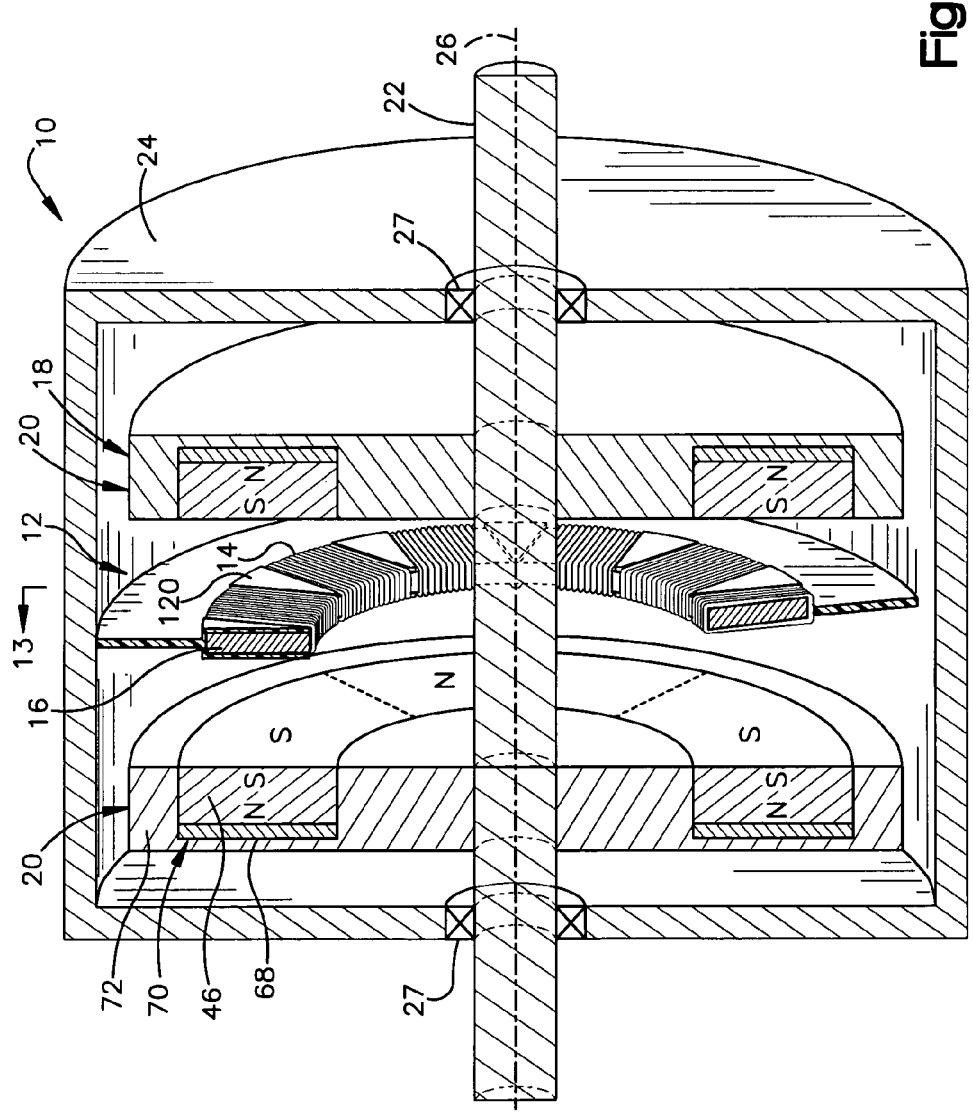
Fig.1
Fig.2

US 7,049,722 B2

MOTOR CORE CONSTRUCTION

This is a division of U.S. application Ser. No. 10/614,371, filed Jul. 7, 2003 U.S. Pat. No. 6,803,691, hereby incorporated herein by reference, which is a continuation of U.S. application Ser. No. 09/923,484, filed Aug. 6, 2001, now U.S. Pat. No. 6,664,689.

TECHNICAL FIELD

This application relates to permanent magnet motors.

BACKGROUND

A motor comprises a multi-pole ring-shaped magnet that rotates relative to a stator. The stator comprises multiple coils toroidally-wound about a ring-shaped core and sequentially disposed along the circumference of the core.

DESCRIPTION OF THE DRAWINGS

FIG. 1 is a sectional perspective view of a motor comprising a first embodiment of the invention;

FIG. 2 is an expanded sectional perspective view of a core of the motor;

DETAILED DESCRIPTION

Figure 3:
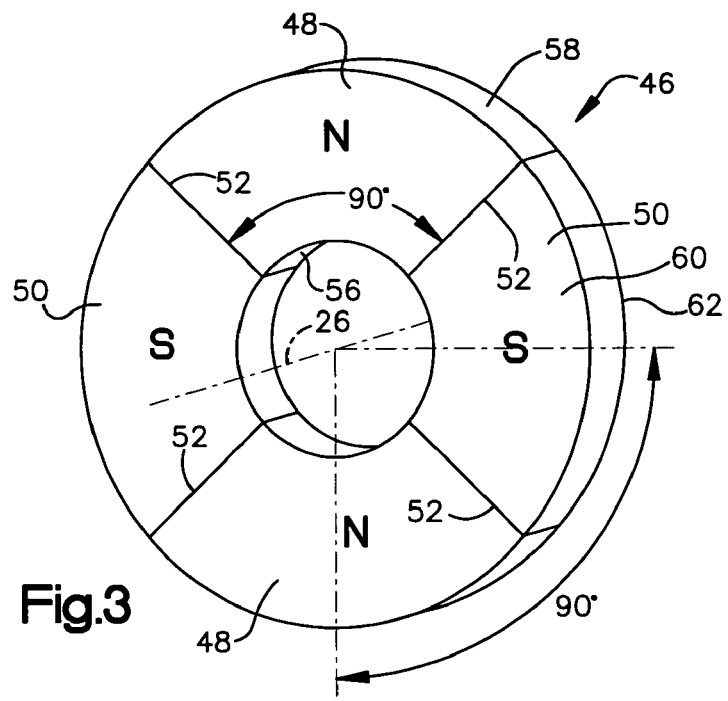
FIG. 3 is a perspective view of a magnet of the motor.

An embodiment of the present invention is shown in FIG. 1. The embodiment is a brushless motor 10. A stator 12 of the motor 10 has coils 14 toroidally wound on a ring-shaped core 16. A rotor 18 of the motor 10 has two magnet assemblies 20 that are disposed on either side of the core 16 and mounted on a rotatable shaft 22. A stationary plastic housing 24 of the motor 10 encases the stator 12 and the rotor 18. The coils 14 are powered by a motor controller (not shown) that activates the coils 14 in a sequence that rotates the rotor 18 relative to the stator 12.

The shaft 22 is of steel and is centered on an axis of rotation 26. The shaft 22 is received by two bearings 27 that are mounted on the housing 24. The bearings 27 are low-friction sleeves configured to enable the shaft 22 to rotate about the axis 26.

As shown in FIG. 2, the core 16 is centered on the axis 26. The core 16 is bounded by two flat side surfaces 30, a cylindrical radially-inner surface 32 and a cylindrical radially-outer surface 34. The core 16 has an inner diameter $ID_c$, an outer diameter $OD_c$ and a thickness $T_c$. The cross-sectional profile of the core 16 is rectangular, and can be square. The profile is centered on an annular axis 36, which runs lengthwise through the core 16. The core 16 has a central section 38 that is magnetically permeable and resistant to eddy currents that would circulate along the skin of the side surfaces 30 of the core 16. To achieve this, the central section 38 is formed of a tightly spirally wound steel tape.

The core 16 also has two annular overlapping sections 42, 43 extending respectively along the radially-inner surface 30 and the radially-outer surface 34. Like the central section 38, the overlapping sections 42, 43 are magnetically permeable. The overlapping sections 42, 43 are resistant to eddy currents that would circulate along the skin of any of the surfaces 30, 32, 34 of the core 16. To achieve this, the overlapping sections 42, 43 are formed of turns of a magnetically permeable wire 44. Alternatively, the overlapping sections 42, 43 can be formed of compressed iron-based powder. The ring is coated on all sides with enamel (not shown).

As shown in FIG. 1, the two magnet assemblies 20 are alike, centered on the axis 26, and facing each other from opposite sides of the core 16. Each magnet assembly 20 includes a ring-shaped magnet 46. As shown in FIG. 3, each magnet 46 is a permanently magnetized multi-pole magnet. Each magnet 46 has two north-south poles 48 interspersed between two south-north poles 50. The poles 48, 50 are symmetrically disposed about the axis 26 and aligned axially. Boundaries 52 between neighboring poles 48, 50 extend radially and are spaced 90° apart. Each pole 48, 50 has a generally trapezoid shape with two straight side edges 52, an arcuate radially-inner edge 56 and an arcuate radially-outer edge 58. In this embodiment, each magnet 46 is formed of C8 ferrite that is molded as a single-piece structure.

Figure 4:
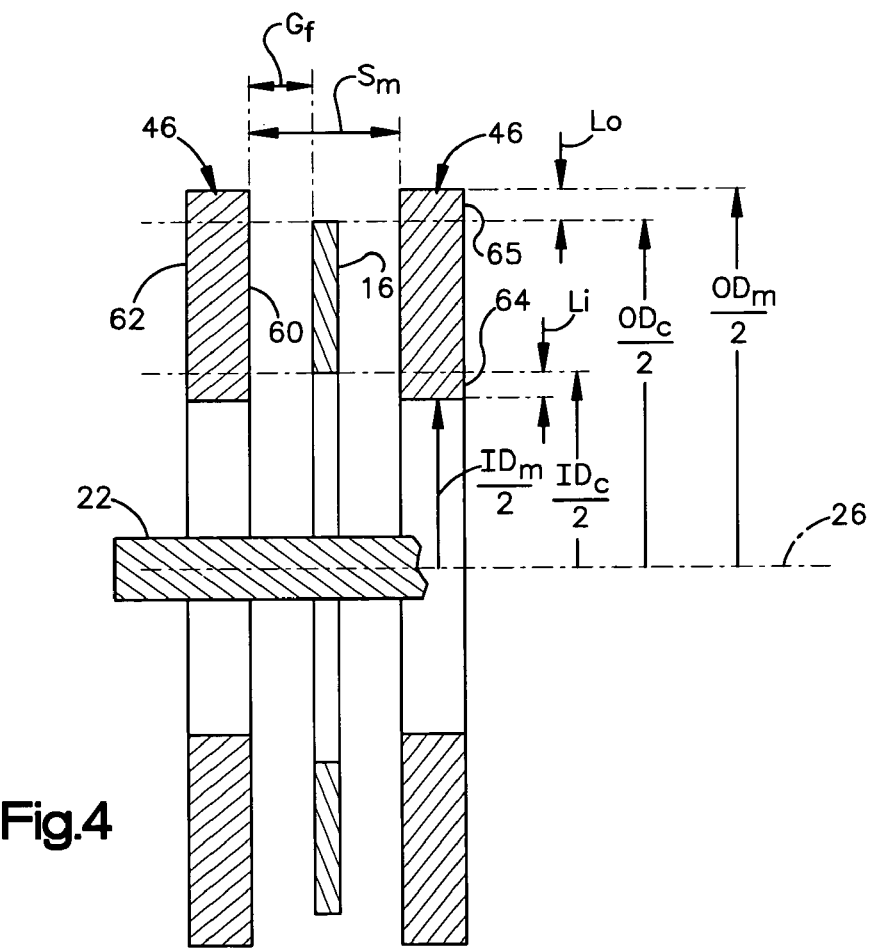
FIG. 4 is a sectional side view of the core and magnets of the motor.

FIG. 4 shows the orientation of the magnets 46 relative to the core 16 when the motor 10 (FIG. 1) is assembled. Each magnet 46 has flat axially-inner and axially-outer surfaces 60, 62. The axially-inner surfaces 60 of the magnets 46 are adjacent to and face the side surfaces 30 of the core 16. The inner diameter $ID_m$ of the magnets is smaller than the inner diameter $ID_c$ of the core. Thus, each magnet 46 has an inner overhang 64, which is the section of the magnet 46 that extends radially inward from the core $ID_c$. The radial length $L_i$ of the inner overhang is approximately equal to the spacing $S_m$ between the axially-inner surfaces 60 of the magnets 46. Similarly, the outer diameter $OD_m$ of the magnets is larger than the outer diameter $OD_c$ of the core 16. Thus, each magnet 46 has an outer overhang 65, which is the section of the magnet 46 that extends radially outward from the core outer diameter $OD_c$. The radial length $L_o$ of the outer overhang 65 is also approximately equal to the spacing $S_m$ between the axially-inner surfaces 60 of the magnets 46. The flux gap $G_f$ is configured as small as possible to maximize flux.

Figure 5:
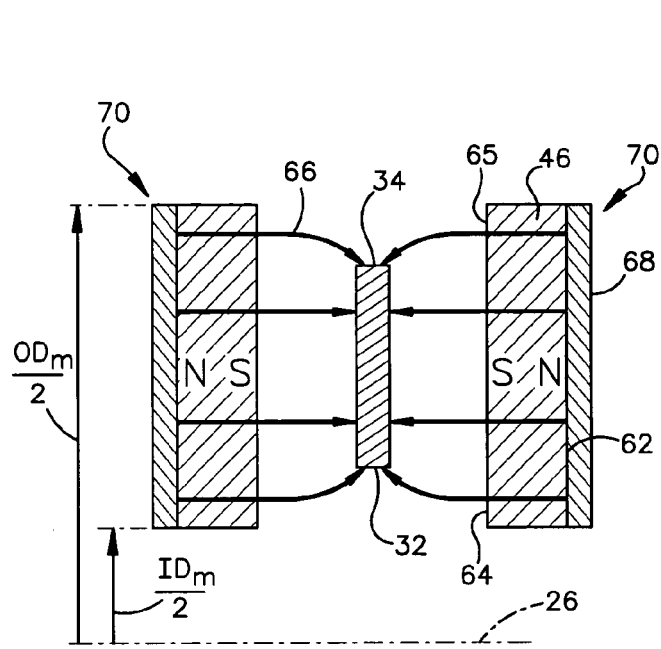
FIG. 5 is a sectional side view of the core, the magnets and backplates of the motor.

As shown in FIG. 5, the magnets 46 are parallel to each other and aligned north-facing-north and south-facing-south. A profile of flux lines 66 is shown. The inner and outer overhangs 64, 65 provide flux through the radially-inner and radially-outer surfaces 32, 34 of the core 16. The portions of the magnets 46 that face the core 16 are attracted axially inward toward the core 16. The overhangs 64, 65 repel each other axially outward. These attractive and repulsive forces substantially cancel each other out. The overhangs 64, 65 thus reduce stresses in the magnet assemblies 20 caused by the attractive force.

The magnet assemblies 20 (FIG. 1) further have identical ring-shaped backplates 68 formed of magnetically permeable material, such as steel. The backplates 68 have the same inner diameter $ID_m$ and outer diameter $OD_m$ as the magnets 46. The backplates 68 are centered on the axis 26 and affixed to the axially-outer surfaces 62 of the magnets 46 to form two magnet/backplate assemblies 70.

Figure 6:
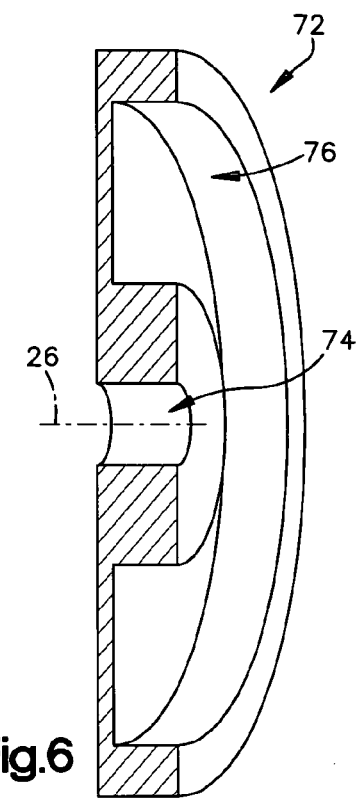
FIG. 6 is a sectional perspective view a disk of the motor.

Each magnet assembly 20 (FIG. 1) further includes a disk 72, shown in FIG. 6. Each disk 72 has a central bore 74 configured to tightly receive the shaft 22 (FIG. 1) in an interference fit. Each disk 72 also has an annular pocket 76 to securely retain the magnet/backplate assembly 70 (FIG. 5). The disks 72 are formed of a non-magnetically permeable material that contracts as it hardens from a fluid state. The material can be zinc or a fiber-reinforced thermoset plastic.

Figure 7:
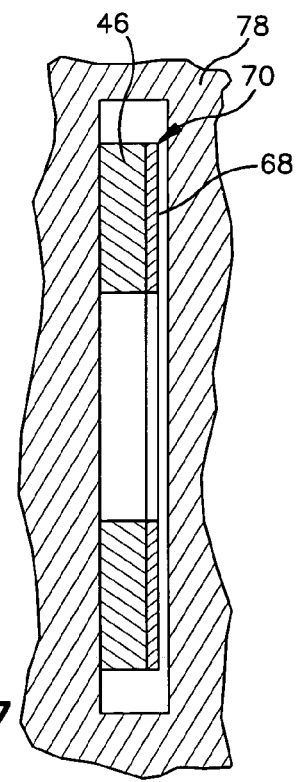
FIG. 7 is a sectional side view of a mold for making the disk of the motor.
Figure 8:
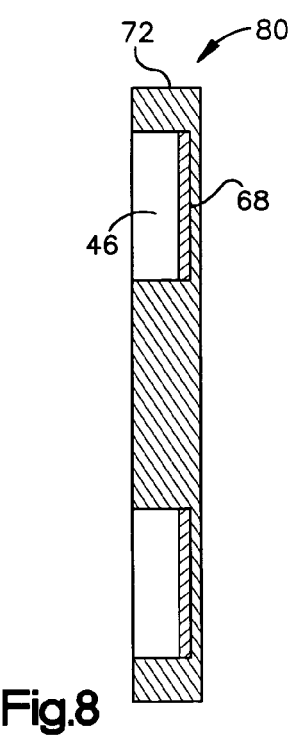
FIG. 8 is a sectional side view of the disk after being molded but before receiving a mounting hole.
Figure 9:
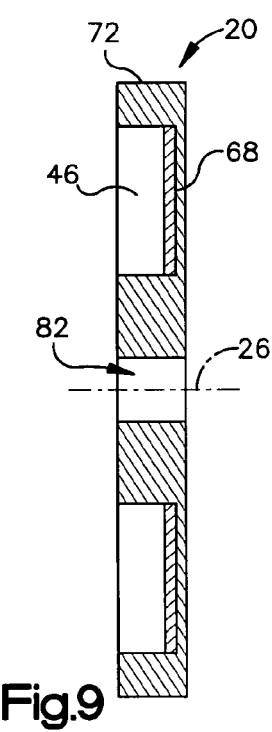
FIG. 9 is a sectional side view of the disk after receiving a mounting hole.

The process for producing the magnet assembly 20 (FIG. 1) comprises the following steps. The magnet 46 is glued to the backplate 68 to form the magnet/backplate assembly 70 shown in FIG. 5. The magnet/backplate assembly 70 is placed within a mold 78 or die cast cavity, as shown in FIG. 7. Within the mold 78, the plastic that will form the disk 72 flows into crevices of the magnet/backplate assembly 70 and adheres to the magnet/backplate assembly 70. As the plastic hardens, the plastic contracts about the magnet/backplate assembly 70 to securely hold the magnet/backplate assembly 70 within the disk pocket 76. This yields a rotor blank 80 shown in FIG. 8, comprising the magnet 46, the backplate 68 and the disk 72. The rotor blank 80 is molded without a mounting hole. Next, the rotor blank 80 is mounted on a balance tester (not shown). The balance tester indicates the center of gravity of the rotor blank 80. A mounting hole 82 is then drilled into the rotor blank 80 at the center of gravity indicated by the balance tester, to yield the magnet assembly 20 shown in FIG. 9. Alternatively, the balance tester is an apparatus that indicates both an initial drilling location and a drilling angle for the rotor blank 80. Then the mounting hole 82 is drilled at the initial drilling location and at the drilling angle to yield the magnet assembly 20 shown in FIG. 9.

Figure 10:
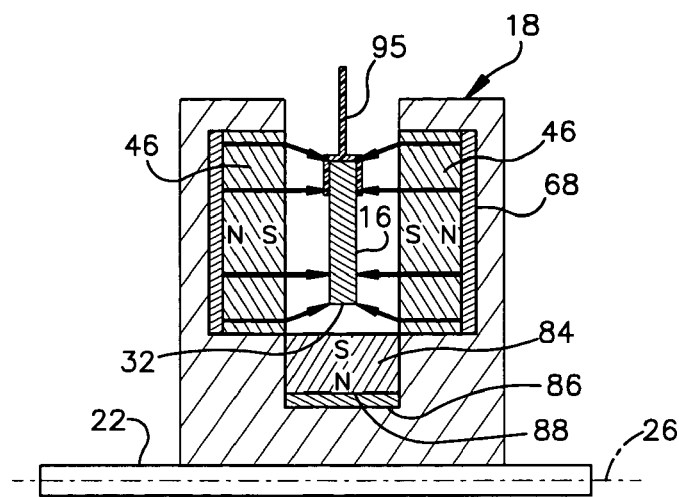
FIG. 10 is a sectional side view of a rotor comprising a second embodiment.

In a second embodiment of the invention, shown in FIG. 10, the rotor 18 further comprises a radially-inner magnet 84 centered on the axis 26 and underlying the radially-inner surface 32 of the core 16. The core 16 is thus surrounded on three sides by the magnets 46, 84, which can be formed together as a one-piece structure. The radially-inner magnet 84 extends axially between the two ring magnets 46 and rotates in unison with the ring magnets 46. The radially-inner magnet 84 has the same sequence of magnetic poles as the ring magnets 46, with north of the radially-inner magnet 84 adjacent north of the ring magnets 46 and south of the radially-inner magnet 84 adjacent south of the ring magnets 46. The radially-inner magnet 84 has an annular backplate 86 adhering to the radially inner surface 88 of the radially-inner magnet 84. The backplate 86 can be an iron-based ring surrounding the shaft 22, as shown in FIG. 10, or can be a portion of the shaft 26 itself.

Figure 11:
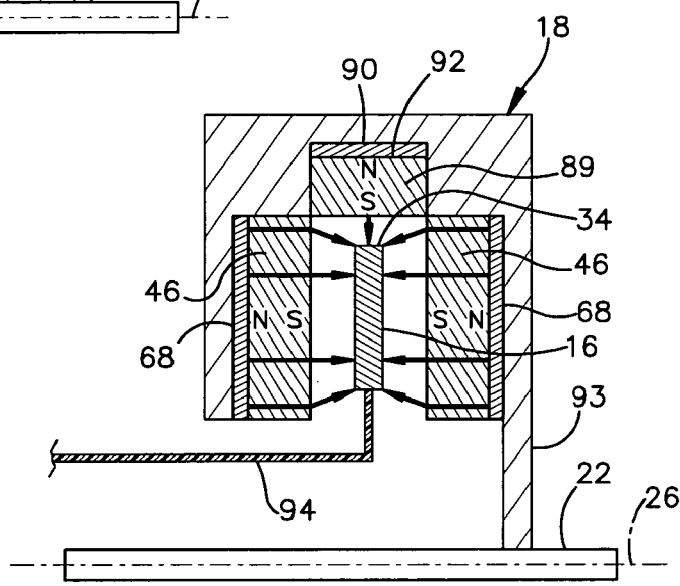
FIG. 11 is a sectional side view of the rotor comprising a third embodiment.
Figure 12:
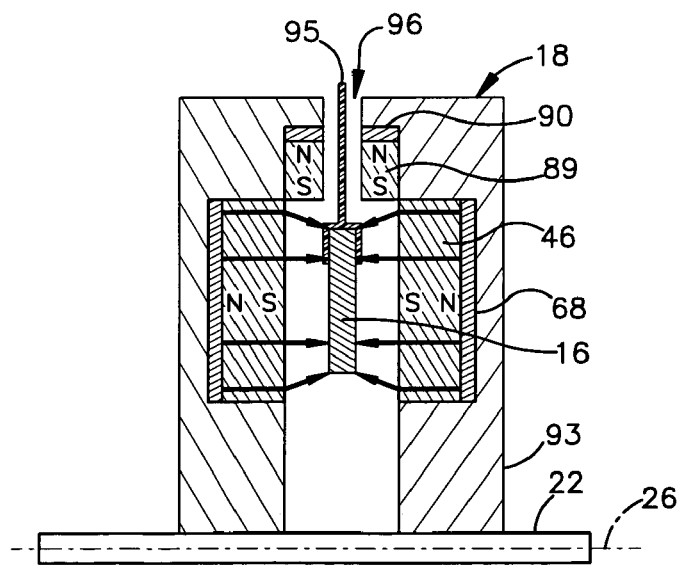
FIG. 12 is a sectional side view of a the rotor comprising a variation of the third embodiment.

In a third embodiment, shown in FIG. 11, the rotor 18 comprises a radially-outer magnet 89 centered on the axis 26 and overlying the radially-outer surface 34 of the core 16. The core 16 is thus surrounded on three sides by the magnets 46, 89, which can be formed together as a one-piece structure. The radially-outer magnet 89 extends axially between the two ring magnets 46 and rotates in unison with the two magnets 46. The radially-outer magnet 89 has the same sequence of magnetic poles as the ring magnets 46, with north of the radially-outer magnet 89 adjacent north of the ring magnets 46 and south of the radially-outer magnet 89 adjacent south of the ring magnets 46. The radially-outer magnet 89 has an annular backplate 90 adhering to a radially outer surface 92 of the annular magnet. The backplate 90 can be a steel ring. The ring magnets 46 and the radially-outer magnet 89 are attached to the shaft 22 through a nonmagnetic disk 93. The core 16 is held in place by a nonmagnetic bracket 94 that extends between the shaft 22 and the core 16. Alternatively, as shown in FIG. 12, the core 16 can be held in place by a different nonmagnetic bracket 95 that extends radially-outward from the core 16 through an annular opening 96 in the radially-outer magnet 89.

Figure 13:
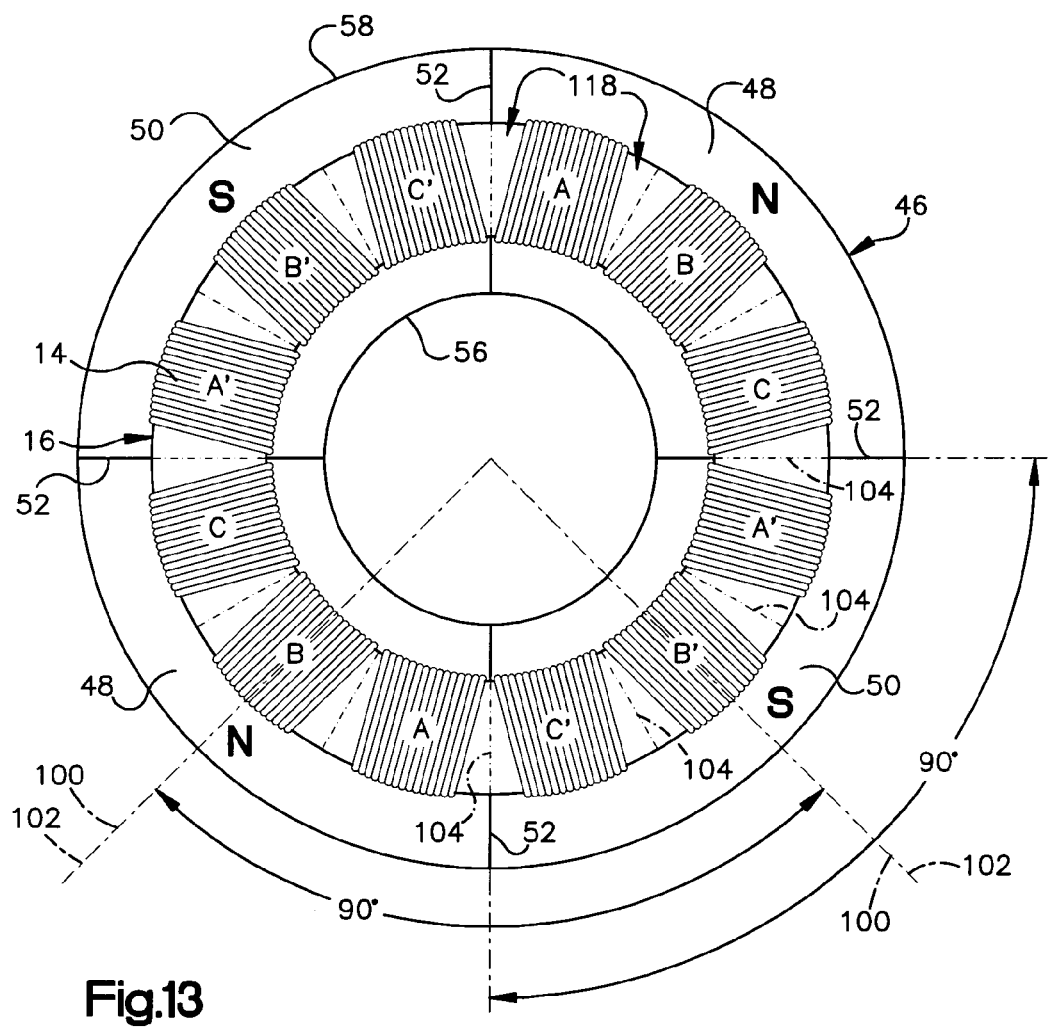
FIG. 13 is a side view of the core and of coils shown in FIG. 1.

The coils 14 are shown in FIG. 13. The coils 14 are formed of insulated electrically-conductive wire, typically copper, toroidally-wound around the core 16. Coils 14 that are connected so as to be electrically activated and deactivated in unison are considered to share a single "phase". This embodiment has three phases, designated A, B and C. The coils 14 are sequentially positioned along the length of the core 16 in a sequence A, B, C, A', B', C', A, B, C, A', B', C', etc. The prime after a letter indicates reverse winding. In this embodiment, the four A coils 14, including primed and unprimed, are in series with each other. Similarly, the four B coils 14 are in series, and the four C coils 14 are in series. Each coil 14 is generally centered on a radially-projecting coil centerline 100.

In FIG. 13, the core 16 is shown overlying one of the magnets 46 to illustrate how the geometry of the coils 14 is related to the geometry of the magnet poles 48, 50. The angular spacing (90° in this embodiment) between coil centerlines 100 of a single phase equals the angular spacing (90°) between pole centerlines 102. Similarly, the angular spacing (90° in this embodiment) between coil boundaries 104 of the same single phase equals the angular spacing (90°) between pole boundaries 52.

Figure 14:
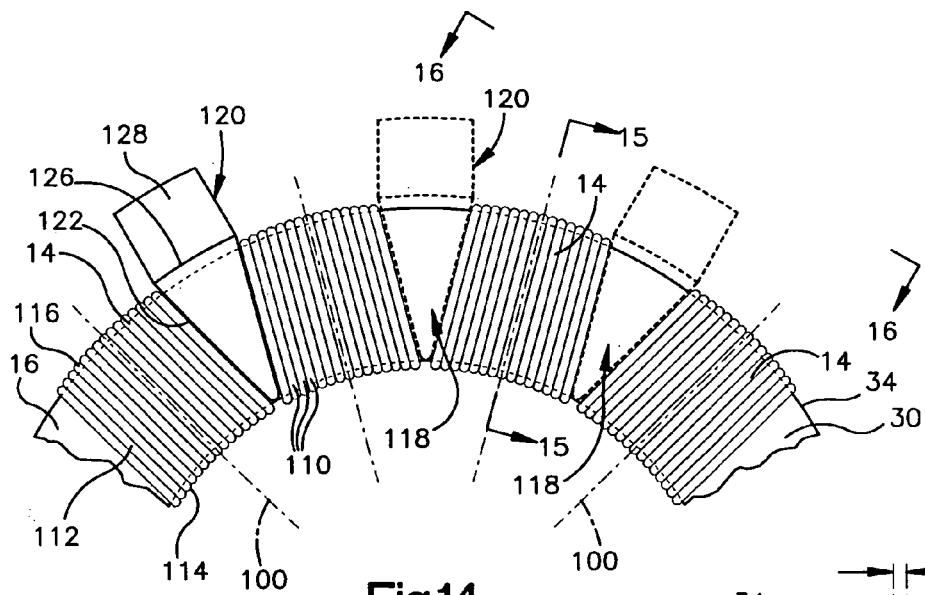
FIG. 14 is an expanded partial view of parts shown in FIG. 13.
Figure 15:
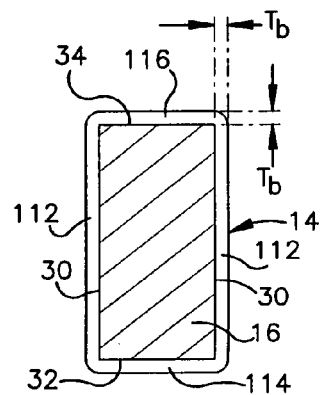
FIG. 15 is a view taken on line 15—15 of FIG. 14.
Figure 16:
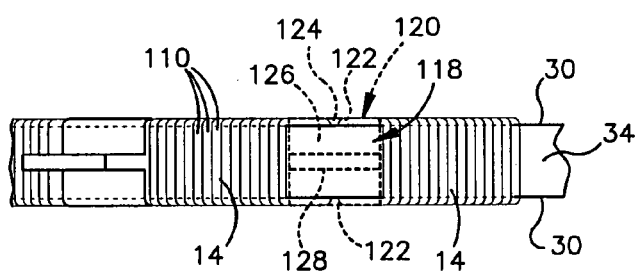
FIG. 16 is a view taken on line 16—16 of FIG. 14.

The coils 14 in this embodiment are alike. The structure of the coils 14 is illustrated in FIGS. 14–16, with reference to one of the coils 14. In this embodiment, each coil 14 comprises one layer of turns 110. The turns are closely packed and substantially parallel to the coil centerline 100.

Each turn of the coil 14 comprises two radially-extending legs 112, a radially-inner end turn 114, and a radially-outer end turn 116. The coil 14 has a bundle thickness $T_b$. The wire has a rectangular, preferably square, profile. This yields lower resistive loss than a similar coil using round wire.

Figure 17:
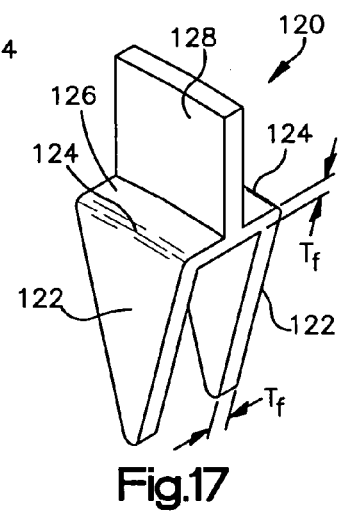
FIG. 17 is a perspective view of a bracket shown in FIG. 1.

Spaces 118 between adjacent coils 14 are filled by brackets 120, such as one shown in FIG. 17. Each bracket 120 comprises two identical generally triangular flanges 122 having rounded edges 124 that are connected by a bowed rectangular flange 126. The flange thickness $T_f$ of the triangular flanges 122 and the rectangular flange 126 approximately equals the bundle thickness $T_b$ (FIG. 15) of the coils 14. The bracket 120 also has a mounting flange 128 extending perpendicularly from the rectangular flange 122. A chain of the brackets 120 can be molded as one piece, with neighboring brackets 120 held together by a thin plastic web.

In FIGS. 14 and 16, the brackets 120 are shown mounted on the core 16. The triangular flanges 122 of each bracket abuts the side surfaces 30 of the core 16, and the rectangular flange 124 abuts the radially-outer surface 34 of the core 16. The mounting flange 128 extends to any suitable section of the housing 24 (FIG. 1) to mount the bracket 120, and thus the core 16, to the housing 24. By filling in the coil-free spaces 118, the brackets 120 provide a smooth flat side surface defined jointly by the radially-extending legs 112 of the coils 14 and the side flanges 122 of the brackets 120. The brackets 120 also thus provide a smooth cylindrical surface defined jointly by the radially-outer turns 116 of the coils 14 and the rectangular flanges 126 of the brackets 120. The brackets 120 serve three functions. They reduce wind turbulence during rotation of the rotor 18; they impart and maintain proper positioning of the coil turns 110; and they connect the core 16 to the housing 24.

The brackets 120 are formed of a non-magnetically permeable material, so as not to affect the magnet flux. In a variation of this embodiment, the trangular flanges 122 and/or the rectangular flange 126 are formed of a magnetically permeability, low eddy current loss material, such as compressed powdered iron, so as to effectively narrow the flux gap $G_f$ (FIG. 4).

Referring to FIG. 1, the stator 12 and rotor 18 are installed in the housing 24. The coils 14 are connected to a brushless motor controller (not shown) to be activated in a manner known in the art. For each phase, the controller can apply forward current, reverse current, or no current. In operation, the controller applies current to the phases in a sequence that continuously imparts torque to turn the magnet assemblies 20 in a desired direction. The controller can decode the rotor position from signals from Hall effect switches or can infer the rotor position based on current drawn by each phase.

Figure 18:
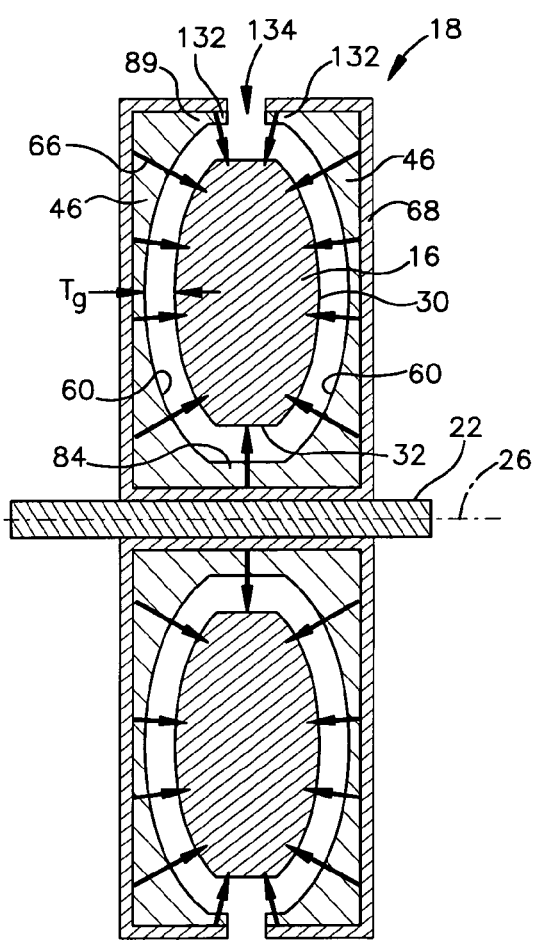
FIG. 18 is a sectional side view of the rotor comprising a fourth embodiment.

In the first embodiment, the core 16 has a rectangular profile with planar side surfaces 30, as shown in FIG. 2. In contrast, in a fourth embodiment, the side surfaces 30 of the core 16 are bowed outward. One example of bowed sides is shown in FIG. 18. The profile is generally lenticular and is thickest at a location about 50–75% of the way from the radially-inner surface 32 to the radially-outer surface 34. This profile renders the core 16 thickest were the flux is strongest and thinnest where the flux is weakest. This profile also reduces the length of the end turns 114, 116 (FIG. 15), which are the legs of the coil 14 that contribute the least torque per resistive loss.

The surfaces 60 of the magnets 46 that face the outwardly-bowed surfaces 30 of the core 16 are bowed inward to yield a gap thickness $T_g$ that is uniform along a significant portion of the periphery of the core profile. Like the second embodiment (FIG. 10), this fourth embodiment includes a radially-inner magnet 84. However, unlike the second embodiment, the radially-inner magnet 84 is one-piece with the ring magnets 46. Like the third embodiment (FIG. 12), this fourth embodiment includes a radially-outer magnet 89, comprising two sections 132 on either side of an opening 134. As illustrated in this embodiment, the magnets 46, 84, 89 can be magnetized such that each flux line 66 is generally perpendicular to the section of the core surface 30 and/or the magnet surface 60 that the flux line 66 intersects.

Figure 19:
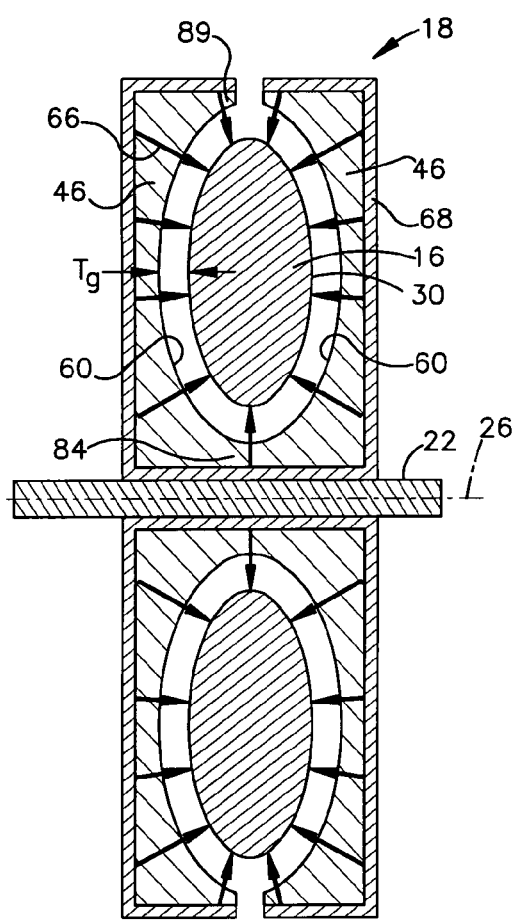
FIG. 19 is a sectional side view of the rotor comprising a variation of the fourth embodiment.

Another example of bowed sides is shown in FIG. 19. The profile of the core 16 is oval. In this variation, the profiles of both the axially-inner and axially-outer surfaces of the magnet match the profile of the core 16. In the examples of FIGS. 18–19, the core 10 is surrounded on four sides by magnets 46, 84, 89.

Figures 20, 21:
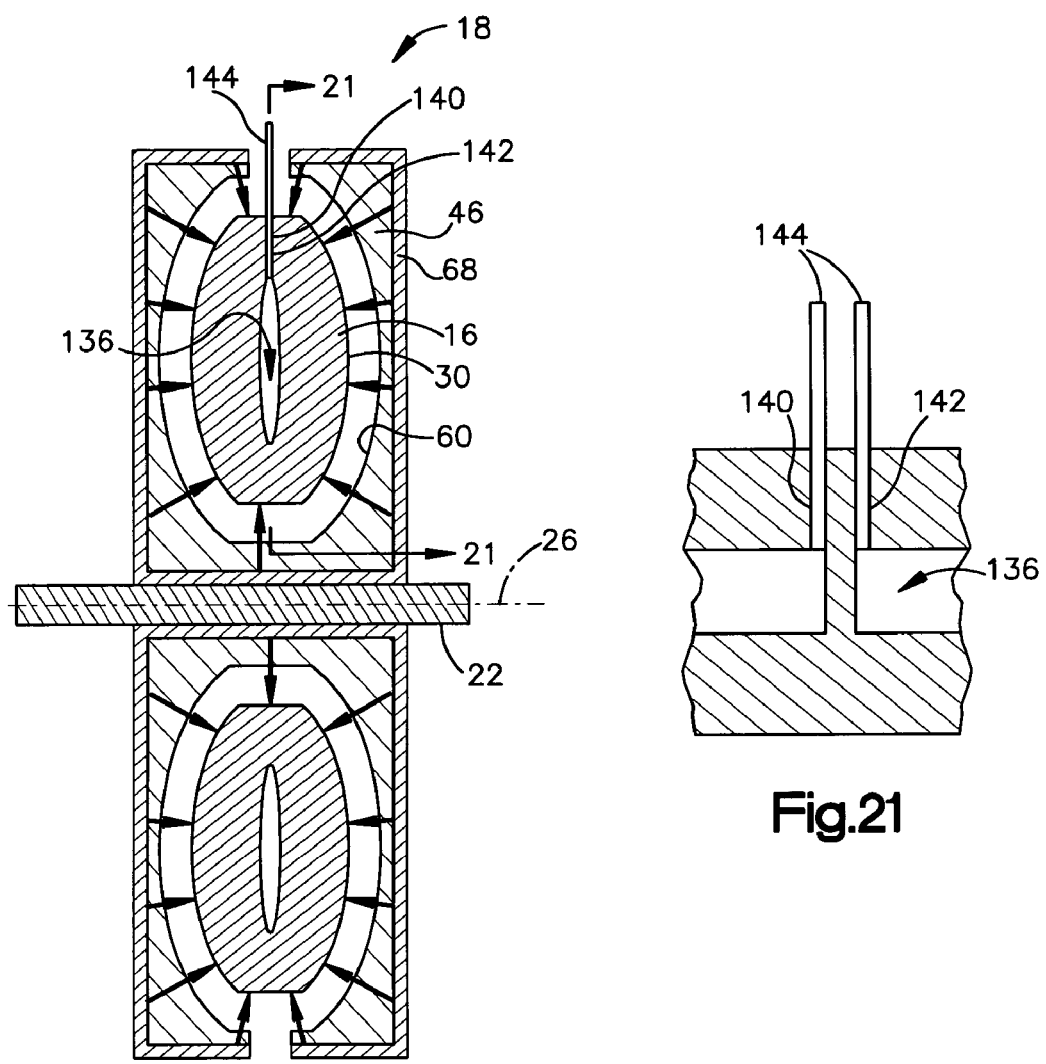
FIG. 20 is a sectional side view of the rotor comprising another variation of the fourth embodiment.
FIG. 21 is a view taken on line 21—21 of FIG. 20.

Another feature is shown in FIGS. 20 and 21. The core 16 has an annular cavity 136 that extends circumferentially through the core 16. The cavity 136 serves as an internal cooling channel. An inlet 140 and an outlet 142 extend radially outward from opposite ends of the cooling channel 136. Tubes 144 attached to the inlet 140 and the outlet 142 enable cooling fluid to be pumped through the cooling channel 136.

Figure 22:
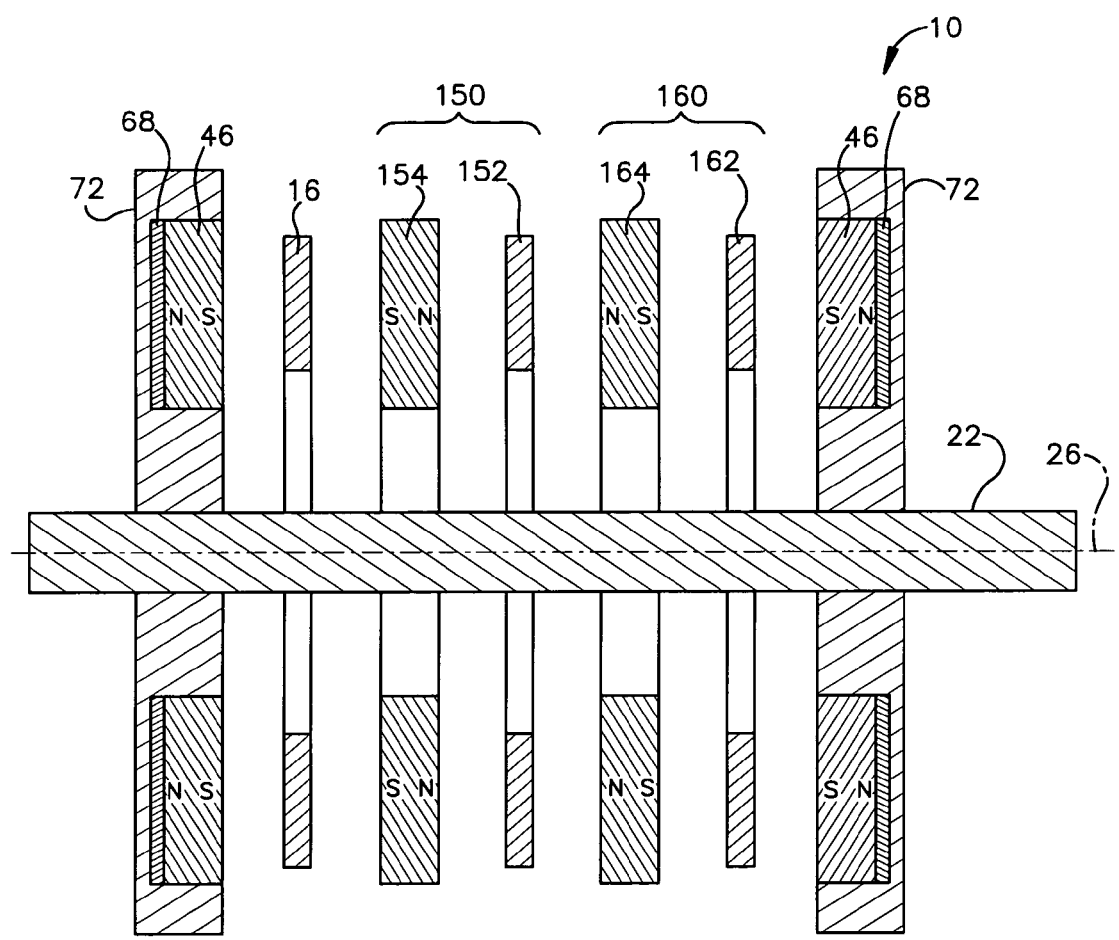
FIG. 22 is a sectional side view of the motor comprising a fifth embodiment.

The first embodiment (FIG. 4) comprises one core 16 disposed between two backplated magnets 46. This is considered a single-stage motor. A fifth embodiment, shown in FIG. 22, includes a second stage 150, comprising a second core 152 and a non-backplated rotating magnet 154, and also a third stage 160, comprising a third core 162 and another non-backplated magnet 164. The second and third stages 150, 160 are interposed between the first core 16 and one of the backplated magnets 46. Thus, the cores 16, 152, 162 are interspersed between the magnets 46, 154, 164. The second and third cores 152, 162 are mounted to the housing 24 (FIG. 1) in any suitable manner, and the non-backplated magnets 154, 164 are mounted to the shaft 22 in any suitable manner. The added stages 150, 160 provide additional motor torque. Any number of such stages is possible. The motor 10 thus is stackable. This stackability enables a manufacturer to build a motor of any desired torque with an inventory of a single-size of magnets and cores.

Figures 23, 24:
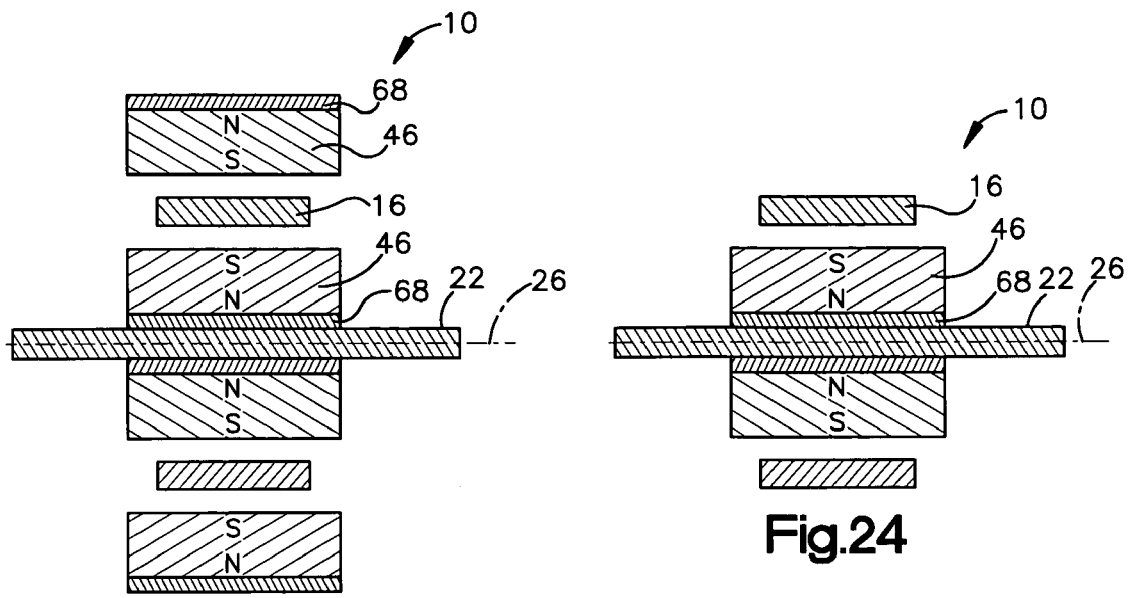
FIG. 23 is a nearsighted sectional side view of the motor comprising a sixth embodiment.
FIG. 24 is a nearsighted sectional side view of the motor comprising a variation of the sixth embodiment.

The first embodiment, shown in FIG. 4 includes two magnets 46 spaced axially from the core 16. In contrast, in a sixth embodiment, shown in FIG. 23, the two ring-shaped magnets 46 are spaced radially from the core 16—specifically, radially inward and radially outward from the core 16. Also, alternatively, as shown in FIG. 24, the motor 10 can have only one ring-shaped magnet 46. In the embodiments of FIGS. 23 and 24, the magnets 46 axially-overhang the core 16, similar to the magnets 46 radially overhanging the core 16 in embodiment of FIG. 4.

Figure 25:
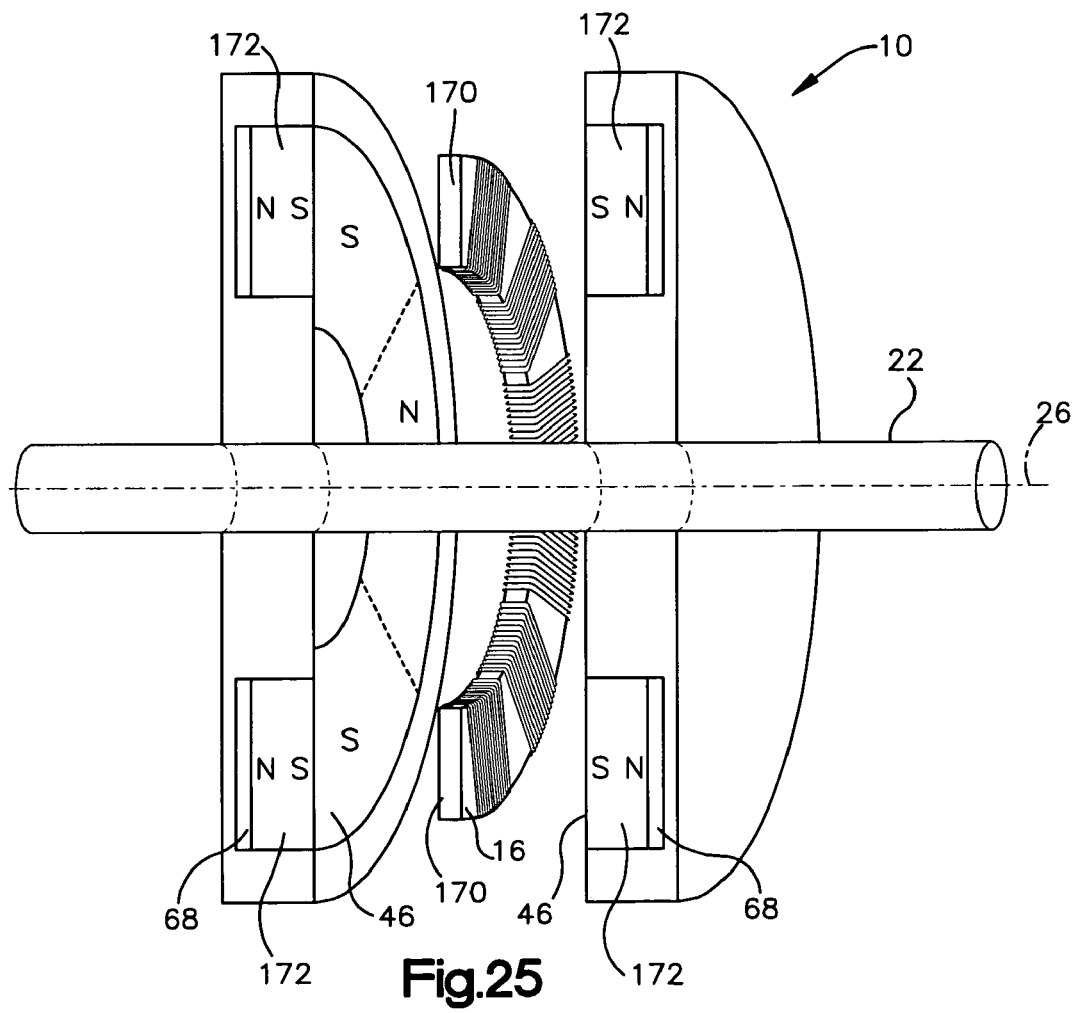
FIG. 25 is a perspective view of the motor comprising a seventh embodiment.

In the previous embodiments (FIGS. 1–24), the core 16 and the magnets 46, 84, 89 are each arcuate and form an endless ring. However, in a seventh embodiment shown in FIG. 25, the core 16 can be arcuate and have ends 170, thus forming an incomplete ring. Similarly, the magnets 46 can be arcuate and have ends 172. This is most suitable in an embodiment in which the magnets 46, 84, 89 have a limited range of rotational motion about the axis 22. In this embodiment, the profiles of the magnets 46 overhang the profile of the core 16.

Figure 26:
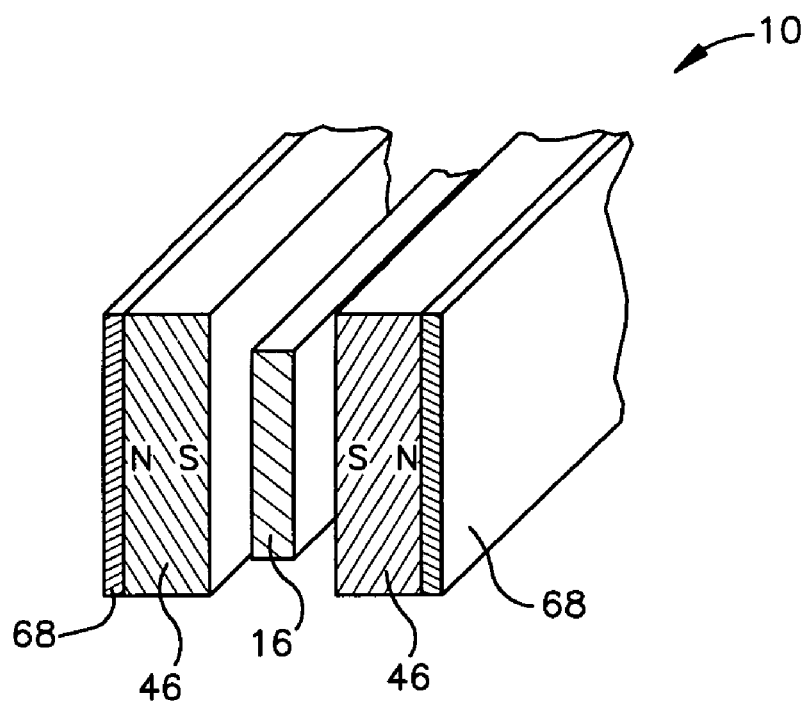
FIG. 26 is a perspective view of the motor comprising an eighth embodiment.
Figure 27:
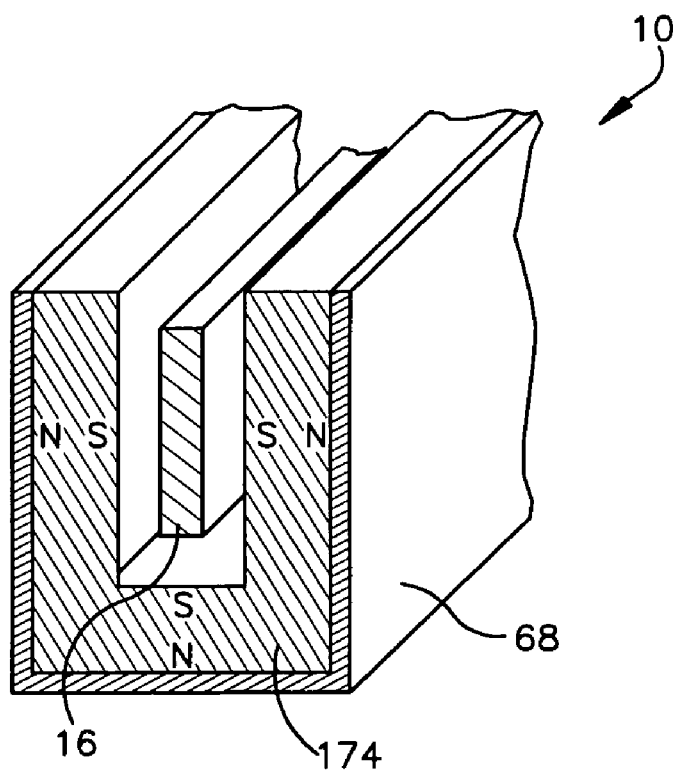
FIG. 27 is a perspective view of the motor comprising a variation of the eighth embodiment.

In an eighth embodiment shown in FIG. 26, the magnets 46 do not rotate but rather move linearly relative to the core 16. The coils (not shown) are wound about the core 16 and sequentially disposed along the length of the core 16. In this embodiment, the magnets 46 overhang the core 16. A variation of this embodiment, shown in FIG. 27, the core 16 is surrounded on three sides by a magnet 174 that also overhangs the core 16. In both embodiments (FIGS. 26 and 27), the magnets 46, 174 have a backplate 68.

An "electrical machine" herein is any device that has both stationary and moving parts and that can convert electrical power into mechanical motion, or vice versa. An electrical machine can be, for example, a generator, a motor, an actuator, or a motion sensor. The present invention can apply to any of such machines. Although, in the embodiments described above, the core 16 (FIG. 1) is part of the stator 12 and the magnet assemblies 20 are part of the rotor 18, the opposite is also within the scope of the invention.

In each of the embodiments, several magnets described as though they are separate structures can equivalently be formed together as a one-piece structure. Conversely, in each of the embodiments, each magnet described as though it were a one-piece structure can equivalently be formed of separate parts combined together. Consequently, for example, in the claims, "surrounded on three sides by a magnet" is equivalent to "surrounded on three sides by magnets."

The "lengthwise direction" or "along the length" herein can refer to either a linear path, an open arcuate path, or a closed circumferential path such as the annular axis 36 (FIG. 2). The term "elongated" herein can characterize the shape of a closed ring, as well as a straight structure, by defining the structure as having a profile that extends uniformly along a circumference.

The embodiments described above are chosen to be included herein only due to their being good examples of or best modes of practicing the invention. The scopes of the claims are therefore not intended to be limited by these embodiments.

What is claimed is:

1. An apparatus comprising:
    a ring-shaped core including a stack of layers of magnetically permeable tape extending about an axis, each layer extending from a first side surface of the stack to an axially opposite second side surface of the stack;
    the core further including a bundle of magnetically permeable strands that extend about the axis and have an axially extending width and a radially extending breadth that are multiple times smaller than an axially extending width and a radially extending breadth of the bundle, the bundle overlying a radially outermost layer of the stack so that magnetic flux lines can enter the opposite side surfaces of the stack but are blocked by the bundle from entering a radially outermost surface of the radially outermost layer.

2. The apparatus of claim 1 further including coils toroidally wound about the core.

3. The apparatus of claim 1 further comprising a ring-shaped multipole permanent magnet surrounding the axis, rotatable about the axis relative to the bundle, and positioned for flux lines from the magnet to enter the bundle and the first side surface of the stack.

4. The apparatus of claim 3 further comprising another ring-shaped multipole permanent magnet surrounding the axis, rotatable about the axis relative to the bundle, and positioned for flux lines from the other magnet to enter the bundle and the second side surface of the stack.

5. The apparatus of claim 3 wherein the magnet has a larger outer diameter than an outer radius of the core.

6. The apparatus of claim 5 wherein the strands have a rectangular cross-sectional profile.

7. The apparatus of claim 1 wherein the bundle of strands is formed of multiple turns of a single strand.

8. An apparatus comprising:
    a ring-shaped core including a stack of layers of magnetically permeable tape extending about an axis, each layer extending from a first side surface of the stack to an axially opposite second side surface of the stack;
    the core further including a bundle of magnetically permeable strands that extend about the axis and have an axially extending width and a radially extending breadth that are multiple times smaller than an axially extending width and a radially extending breadth of the bundle, the bundle underlying a radially innermost layer of the stack so that magnetic flux lines can enter the opposite side surfaces of the stack but are blocked by the bundle from entering a radially innermost surface of the radially innermost layer.

9. The apparatus of claim 8 further including coils toroidally wound about the core.

10. The apparatus of claim 8 further comprising a ring-shaped multipole permanent magnet surrounding the axis, rotatable about the axis relative to the bundle, and positioned for flux lines from the magnet to enter the bundle and the first side surface of the stack.

11. The apparatus of claim 10 further comprising another ring-shaped multipole permanent magnet surrounding the axis, rotatable about the axis relative to the bundle, and positioned for flux lines from the other magnet to enter the bundle and the second side surface of the stack.

12. The apparatus of claim 10 wherein the ring-shaped magnet has a smaller inner radius than an inner radius of the core.

13. The apparatus of claim 8 wherein the strands have a rectangular cross-sectional profile.

14. The apparatus of claim 8 wherein the bundle of strands is formed of multiple turns of a single strand.

* * * * *